United States Patent [19]

Diaz

[11] 4,413,028

[45] Nov. 1, 1983

[54] MASS CONNECTOR DEVICE

[75] Inventor: Stephen H. Diaz, Los Altos Hills, Calif.

[73] Assignee: Raychem Corporation, Menlo Park, Calif.

[21] Appl. No.: 341,427

[22] Filed: Jan. 21, 1982

Related U.S. Application Data

[63] Continuation of Ser. No. 172,897, Jul. 28, 1980, abandoned.

[51] Int. Cl.³ .................. H01R 4/00; H02G 13/06
[52] U.S. Cl. .................. 428/36; 174/84 R; 174/88 R; 174/DIG. 8
[58] Field of Search ........... 174/84 R, 88 R, DIG. 8; 428/36

[56] References Cited

U.S. PATENT DOCUMENTS

| | | | |
|---|---|---|---|
| 3,239,125 | 3/1966 | Sherlock | 228/56 |
| 3,243,211 | 3/1966 | Wetmore | 287/78 |
| 3,253,618 | 5/1966 | Cook | 138/125 |
| 3,253,619 | 5/1966 | Cook et al. | 138/125 |
| 3,305,625 | 2/1967 | Ellis | 174/84 |
| 3,316,343 | 4/1967 | Sherlock | 174/84 |
| 3,382,121 | 5/1968 | Sherlock | 156/165 |
| 3,396,894 | 8/1968 | Ellis | 228/56 |
| 3,448,182 | 6/1969 | Derbyshire | 264/22 |
| 3,451,609 | 6/1969 | Gillett | 228/56 |
| 3,501,565 | 3/1970 | Kalwaites | 264/288 |
| 3,525,799 | 8/1970 | Ellis | 174/84 |
| 3,654,017 | 4/1972 | Ropiequet et al. | 156/251 |
| 3,678,174 | 7/1972 | Ganzhorn | 174/84 R |
| 3,721,749 | 3/1973 | Clabburn | 174/88 R |
| 3,818,123 | 6/1974 | Maltz | 174/88 C |
| 3,872,194 | 3/1975 | Lowry | 264/22 |
| 3,899,807 | 8/1975 | Sovish | 24/255 C |
| 3,948,709 | 4/1976 | Ida | 156/209 |
| 3,949,110 | 4/1976 | Nakajima | 428/36 |
| 3,995,964 | 12/1976 | De Groef | 403/272 |
| 4,077,692 | 3/1978 | Ellis et al. | |
| 4,085,286 | 4/1978 | Horsma et al. | |
| 4,101,699 | 7/1978 | Stine | 428/36 |
| 4,300,284 | 11/1981 | Reeder | 174/DIG. 8 |
| 4,376,798 | 3/1983 | Diaz | 174/DIG. 8 |

FOREIGN PATENT DOCUMENTS

| | | |
|---|---|---|
| 1154280 | 4/1958 | France . |
| 2114004 | 6/1972 | France . |
| 2286528 | 4/1976 | France . |
| 2337445 | 7/1977 | France . |
| 1046367 | 10/1966 | United Kingdom . |
| 1334556 | 10/1973 | United Kingdom . |
| 1334969 | 10/1973 | United Kingdom . |
| 1342202 | 1/1974 | United Kingdom . |
| 1359704 | 7/1974 | United Kingdom . |
| 1487822 | 10/1977 | United Kingdom . |
| 1527282 | 10/1978 | United Kingdom . |
| 1545571 | 5/1979 | United Kingdom . |
| 1580210 | 11/1980 | United Kingdom . |

Primary Examiner—William R. Dixon, Jr.
Attorney, Agent, or Firm—James W. Peterson; Derek P. Freyberg

[57] ABSTRACT

A connector device comprises first and second layers of substantially cross-linkable material, the first layer having inserts in contact therewith, the second layer having been expanded and thereafter formed into working and bonding zones, and the sheets being bonded together at the bonding zones for acceptance of substrates to be connected. The device is so constructed that the working zone center-to-center spacing remains constant on recovery.

34 Claims, 13 Drawing Figures

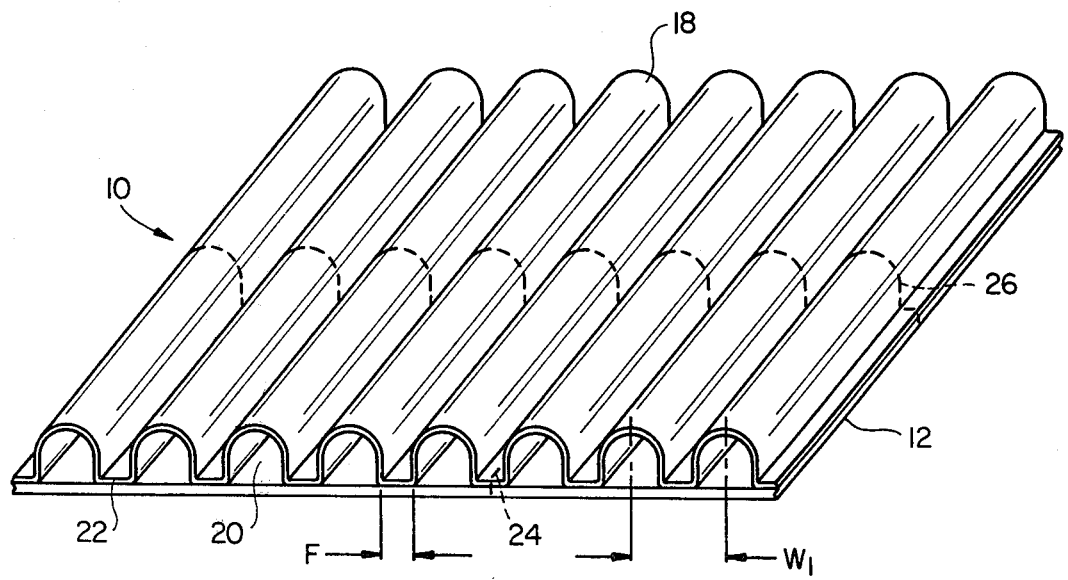
FIG_1
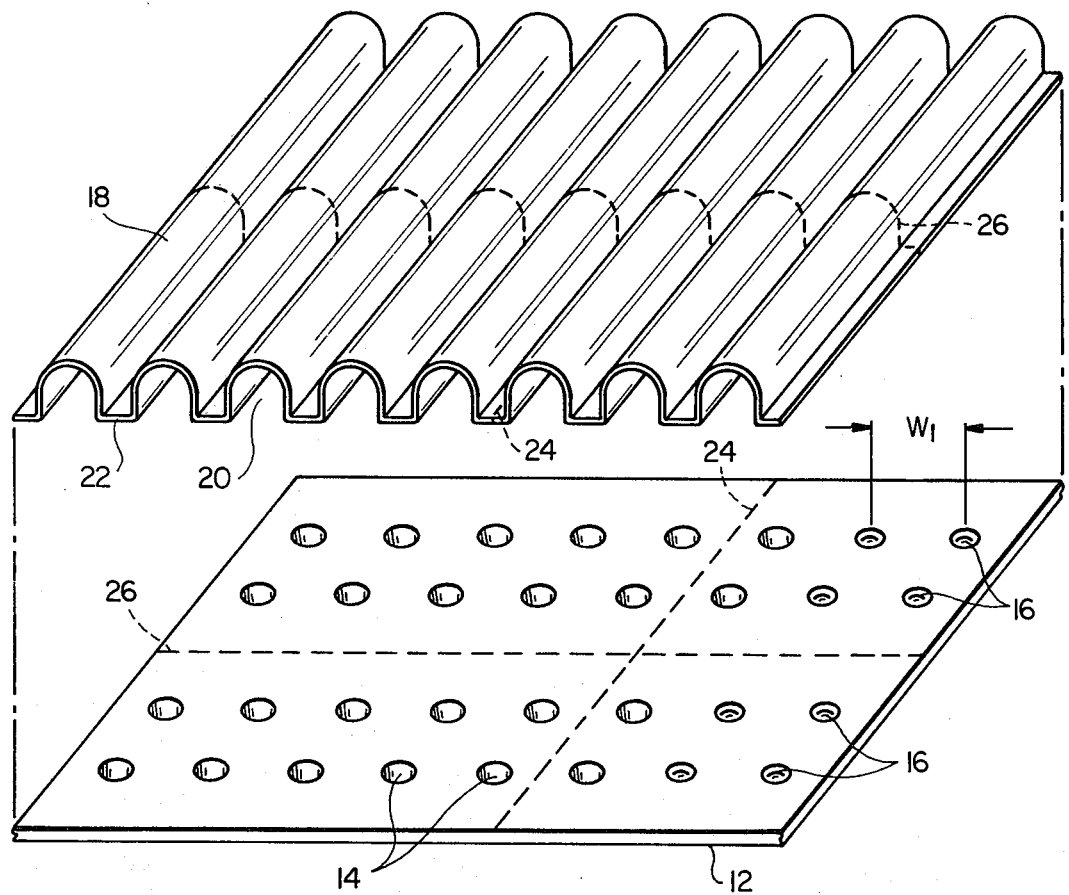
FIG_2

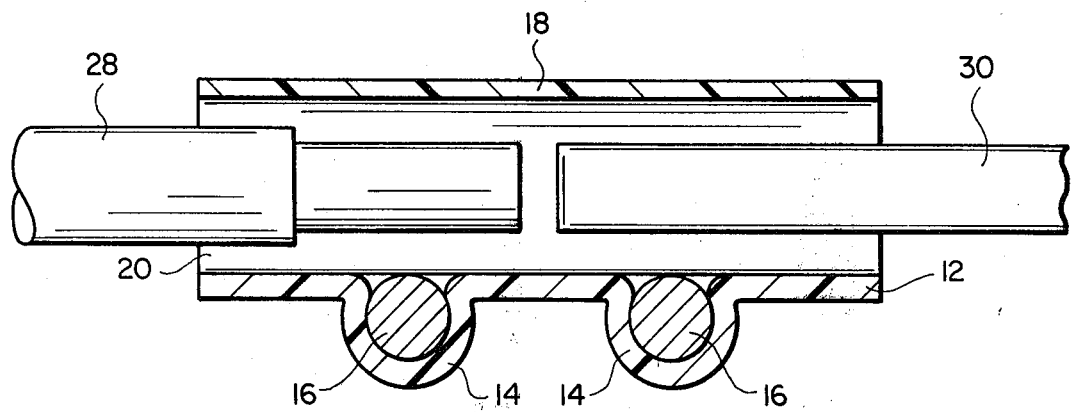
FIG 3
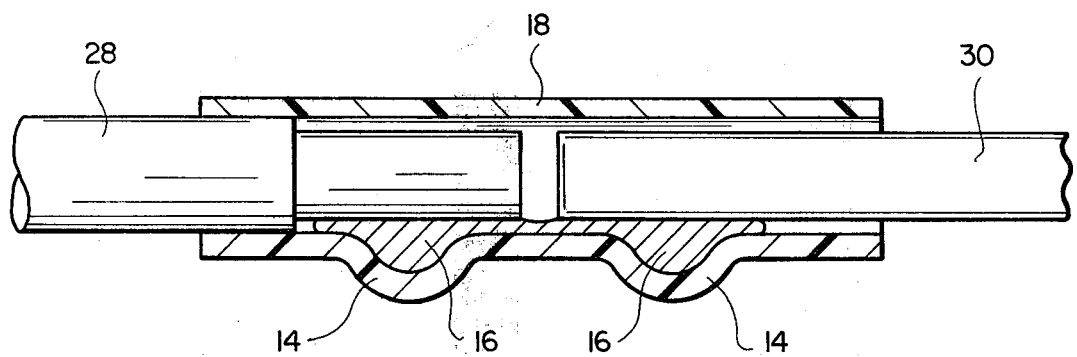
FIG_4
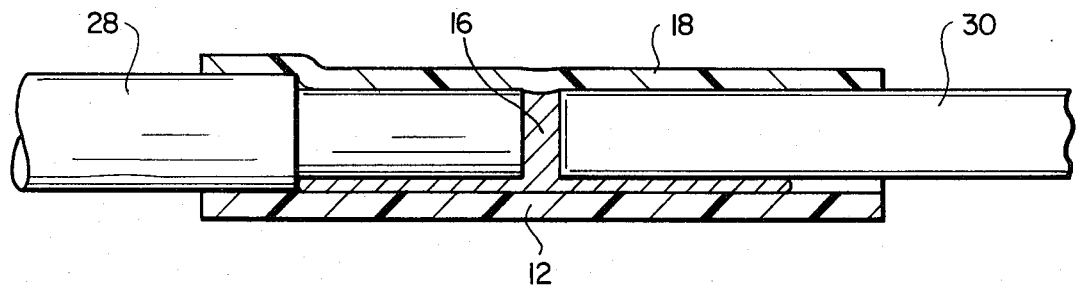
FIG_5

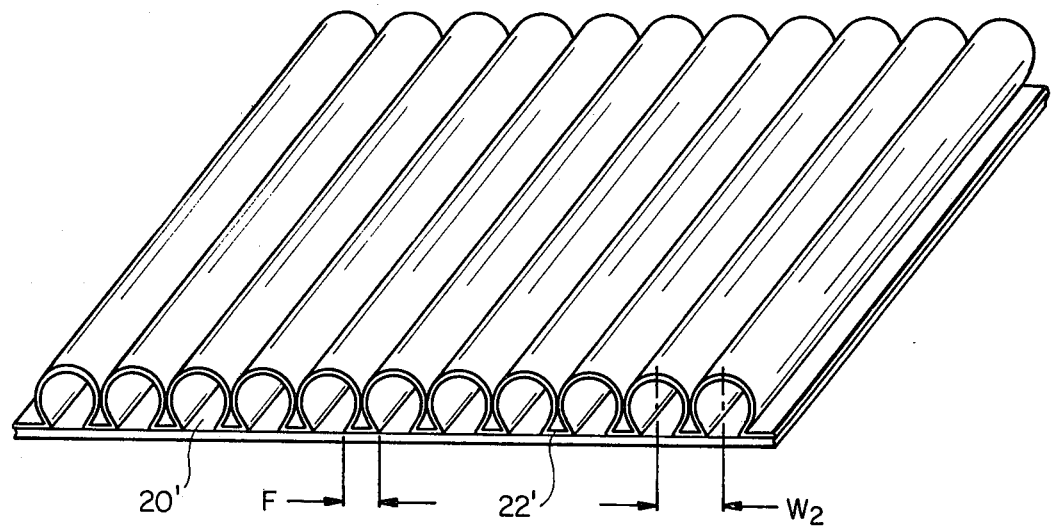
FIG_6
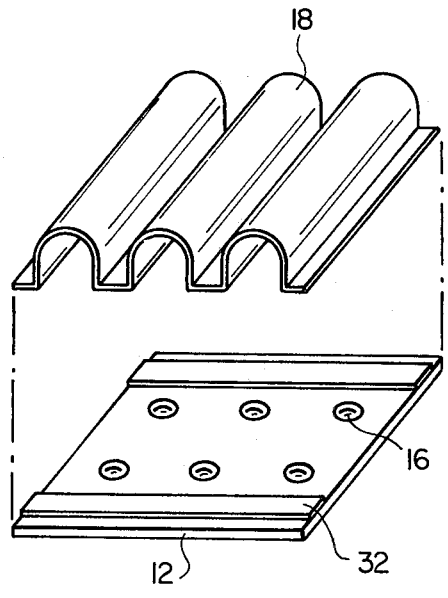
FIG_7A
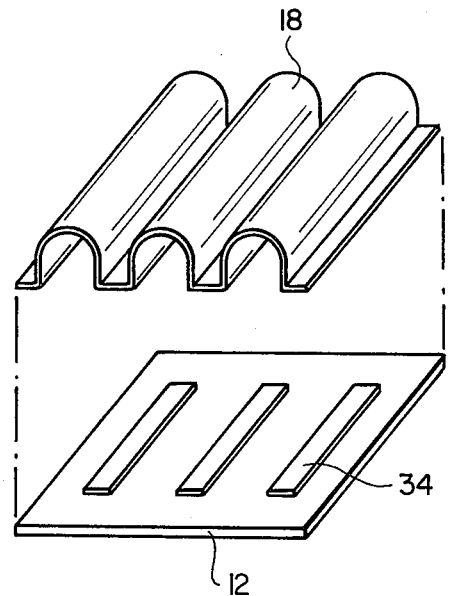
FIG_7B

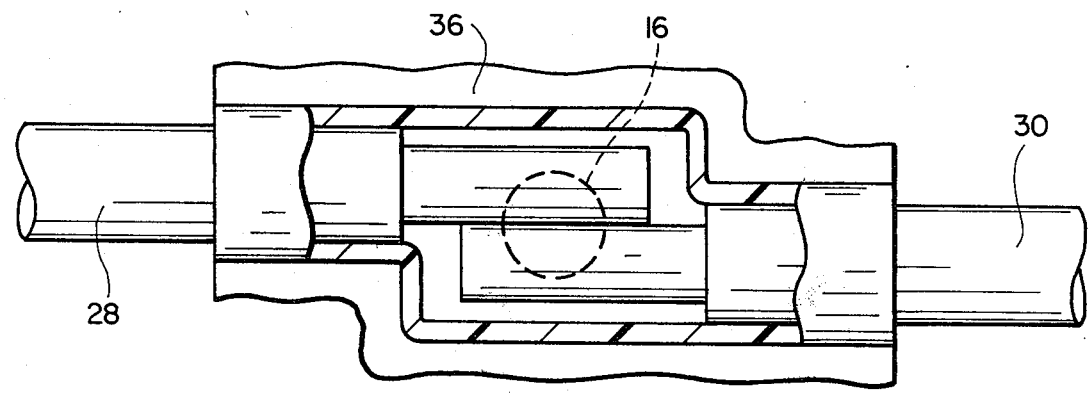
FIG_8
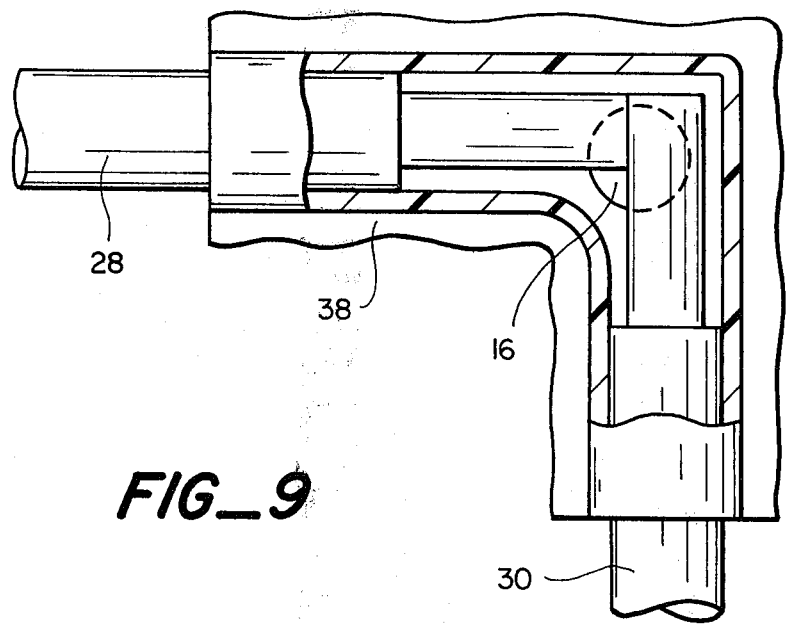
FIG_9
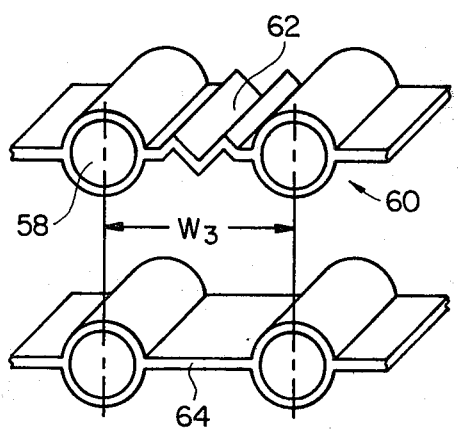
FIG_10
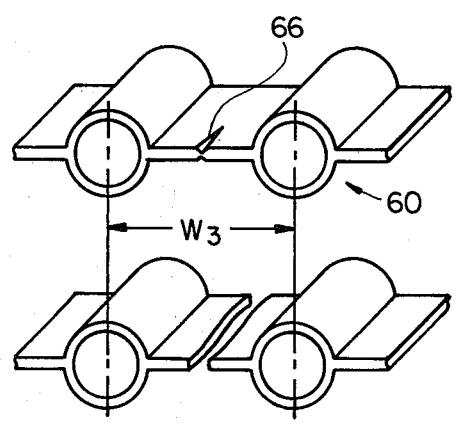
FIG_11

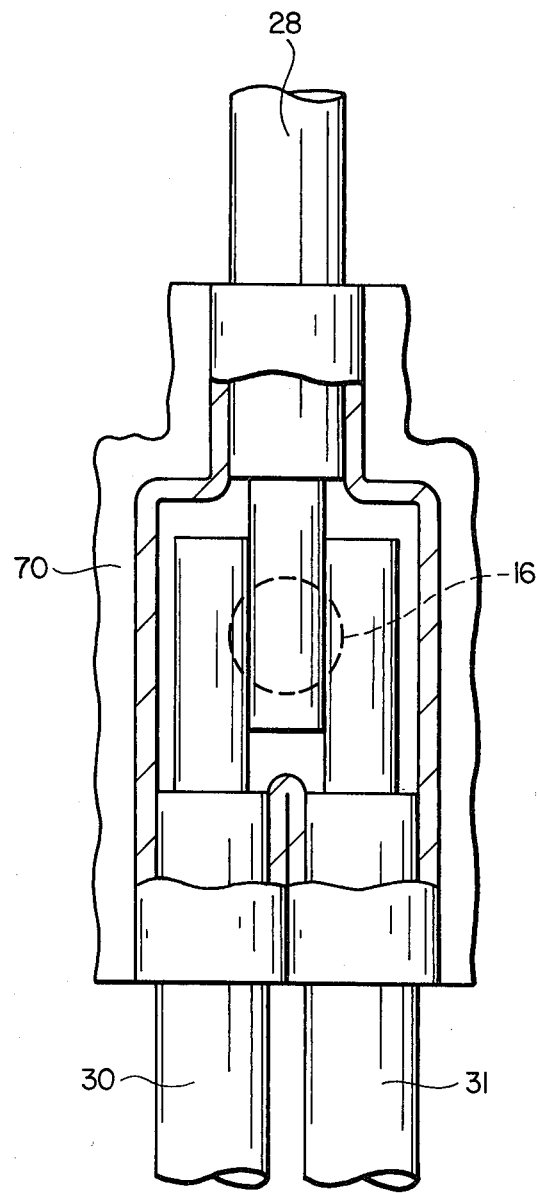
FIG_12

MASS CONNECTOR DEVICE

This application is a continuation, of application Ser. No. 172,897, filed July 28, 1980 now abandoned.

BACKGROUND

Hollow heat-recoverable articles have generally been produced by forming a polymer into the desired heat-stable configuration, simultaneously or subsequently cross-linking the polymer in its heat-stable configuration, heating and then deforming the article, and then cooling the article while in the deformed state so that the deformed configuration is retained. In use, since the deformed state of the article is heat-unstable, application of heat will cause the article to revert or tend to revert to its original heat-stable configuration. Further, as a result of cross-linking, the article may be heated to a temperature considerably above its melting point without melting the article.

When it is desired to provide such articles with inserts, it has frequently been necessary to load such inserts after the completion of the article on an item-by-item basis, e.g. by way of a manual or semi-automatic finishing process. Even when automatic or continuous methods have been available, e.g. in the case of articles coated internally by coextrusion methods, such manufacture is relatively expensive. Frequently, however, the hollow articles are of such a configuration that they cannot be produced directly by extrusion, such as when they are of non-constant cross-section along any axis thereof. For example, boots, udders (as used herein the term udder refers to an article comprising a plurality of intersecting hollow regions employed in the termination of electrical cables, and also commonly referred to as cable "breakouts"), end-caps, or the like articles have been formed into the desired heat stable configuration on an item-by-item basis by moulding, e.g. by injection, compression or transfer moulding techniques.

Previously it has been known that one may form a hollow, generally tubular connector device having solder therein and wherein substrates such as electrical wires may be inserted in the connector device, so that, upon application of heat, the hollow device collapses and the solder fuses, thereby connecting the substrates as is generally set forth in U.S. Pat. No. 3,243,211.

However, as is well known, one must insert the working matter usually by hand or, at the very best, by a semi-automatic process in order to form the fusible connector. As can be appreciated, such manual labor is quite expensive. However, since it is well known that heat recoverable (substantially cross-linked) sheets do not readily bond, there has been no other alternative. In order to make a device which was heat recoverable, such as that of U.S. Pat. No. 3,243,211, the hollow connector had to be cross-linked and expanded prior to the insertion of the insert.

It had always been considered that if cross-linked material could be bonded together the problem would be solved. The solution would then simply be to have one sheet stamped or printed with solder in a predetermined manner. The second sheet could then be fused over the first sheet and a heat recoverable connector having solder in an appropriate pattern could thus be formed by an automatic process.

As is well known, however, it has heretofore been considered impossible to fuse together two substantially cross-linked sheets.

U.S. Pat. No. 3,396,894 discloses the packaging of metered amounts of flux and solder in a heat-recoverable preformed sheet which forces the solder into place.

It may be noted that this patent is not a hollow connector but comprises merely one sheet of material imprinted with solder.

U.S. Pat. No. 3,721,749 discloses a multiple connection device having open ends formed from two identical sheets. Upon heat recovery the working zones collapse towards one another causing the inserts to be enclosed. Applicant's invention allows the inserts to remain at approximately the same distance from one another throughout the entire heat recovery process without movement of both sheets.

SUMMARY OF THE INVENTION

In a first embodiment of the applicant's invention where the sheets have different recovery properties, the device comprises a first sheet having localized expanded portions defining pockets; a second sheet being expanded and formed into working and bonding zones, insert being placed between the sheets, the sheets placed in the desired registry with one another and bonded together with the inserts between them. The connector may be substantially cross-linked to allow heating of the sheets beyond their melting temperature, as will be more fully appreciated hereinafter.

Substrates to be connected are then inserted in the connector and heat is applied. Depending upon the material chosen the second sheet recovers before the first sheet. Upon continued application of heating, and (if desired) increased heating, the first sheet may then recover, ejecting the working matter into the partially or fully collapsed working zones which have gripped the substrates inserted therein.

It may be seen that there is no recovey of the bonding zones, because the bonded expanded portion of the second sheet is unable to recover as a result of its bonding to the first sheet. Since the first sheet was not expanded, it does not in fact recover. Thus, the distance between the center lines of the working zones remains the same and the connector does not recover in a lateral direction.

Unless the polymeric material of the sheets has special properties it will ordinarily melt away under the heat needed to activate the inserts. Applicant achieves the desired feature of allowing the connector to be overheated usually by cross-linking the polymeric material.

Applicant preferably achieves a heat-recoverable hollow connector into which inserts may be loaded automatically through the method of expanding at a low temperature before cross-linking and subsequently substantially crosslinking the materials to insure non-melting.

The inserts may comprise any material that is desired to be located inside of the hollow heat-recoverable article to perform the desired function. One type of insert is fusible at the recovery temperature of the article, e.g. a hot-melt adhesive or a solder insert, such as described in U.S. Pat. No. 3,243,211, the disclosure of which is incorporated herein by reference. A second type of insert is a sealant, e.g. a highly viscous liquid, paste, grease, thermoplastic or thermoset resin. A third type of insert is a liner. A fourth type of insert is an electrical screen, for example, a liner in the form of an electrically conducting braid.

In general, the insert will comprise solder. As used herein, solder means any metal or metallic alloy used to join metallic surfaces by melting that metal or metallic alloy and then allowing it to cool. The solder may contain a flux core and/or may be coated with flux.

Polymeric materials suitable for forming the sheets of this invention are well-known in the art, and indeed most polymers, upon suitable treatment, may be used.

The polymeric materials can be tailored to suit the intended use by the addition of fillers, e.g. semi-conducting fillers or anti-tracing agents, flame retardants, plasticisers, pigments, stabilisers and lubricants, or where necessary, e.g. where the polymeric material is substantially non-crystalline, a hold-out agent such as a thermoplastic polymer, e.g. polyethylene, may be included in the material.

The polymeric material may be cross-linked by irradiation, for example, by means of an electron beam or by γ-radiation, or it may be chemically cross-linked. Whichever cross-linking process is used, it may be advantageous to incorporate one or more co-curing agents such as are well-known in the art.

OBJECTS OF THE INVENTION

It is an object of the present invention to provide a hollow heat-recoverable connector which is capable of being manufactured cheaply and in an automatic fashion.

It is a further object of this invention to provide a hollow heat-recoverable connector which, on recovery, does not change substantially in dimension.

More particularly, it is an object of this invention to provide a mass connector which is so constructed that the center-to-center spacing remains constant on recovery.

DESCRIPTION OF THE DRAWING

FIG. 1 is a perspective view of a first embodiment of this invention.

FIG. 2 is a perspective view of the components forming the embodiment of FIG. 1.

FIG. 3 is a cross-sectional view of the working zone of the present invention showing substrates inserted in the working zone before the application of heat.

FIG. 4 depicts the working zone of FIG. 3 during the application of heat.

FIG. 5 depicts the working zone of FIG. 3 after the completion of heating.

FIG. 6 is a perspective view of a second embodiment of this invention wherein the second sheet has omega-shaped working zones.

FIGS. 7A and 7B illustrate third and fourth embodiments of the instant invention. In FIG. 7A, two types of inserts are present; while in FIG. 7B, the inserts are in the form of strips.

FIG. 8 is a partial cut-away view of a fifth embodiment of this invention comprising an off-set connector.

FIG. 9 is a partial cut-away view of a sixth embodiment of this invention comprising a right angle connector.

FIGS. 10 and 11 are perspective views of seventh and eighth embodiments of this invention wherein each has a compliant region for constant center spacing before and after heat recovery.

FIG. 12 is a partial cut-away view of another embodiment of this invention comprising an udder shaped connector.

DESCRIPTION OF THE PREFERRED EMBODIMENTS

In the drawings, like reference characters designate like or corresponding parts throughout the several views.

FIG. 1, shows a first embodiment of the invention generally indicated at 10, a hollow connector device.

As seen in FIGS. 1 and 2, the connector comprises a first sheet 12 which includes localized expanded portions defining pockets 14 for holding inserts, such as are shown at 16. For reasons explained heretofore, the expansion in sheet 12 creating pockets 14 occurs at a temperature below the melting point of the material of sheet 12. Additionally, the pockets 14 may be formed by pressing the inserts 16 into the first sheet 12.

The rest of sheet 12 remains unexpanded, so that even after cross-linking it will not shrink on application of heat, and will thereby maintain the distance $W_1$ between the pockets.

The pockets 14 may be created by automatic methods, such as by "dimpling" prior to insertion of the inserts or by mass insertion or embedding of the inserts 16.

In this embodiment of the first sheet, inserts 16 are shown within the pockets 14 to achieve an unobstructed passageway for the insertion of substrates to be connected, such as shown in FIG. 3. The protrusions formed in the first sheet by pockets 14 and inserts 16 may also provide a convenient method of "indexing" the connector with the substrates with which it is to be employed.

The connector 10 also comprises a second sheet 18 having an original heat-stable shape. This sheet has been expanded to a second heat-unstable shape and formed into alternating working and bonding zones 20 and 22 as indicated in FIGS. 1 and 2.

As shown in FIG. 2, the first sheet 12 has been loaded with inserts 16. The sheets 12 and 18 are then aligned with one another and are bonded together by generally known methods with the working matter between them.

The fused sheets may then be substantially cross-linked, thereby creating a non-melting, hollow, heat-recoverable connector having inserts capable of having been placed therein by automatic mass methods.

The sheets may then be broken up into a predetermined size by cutting along perforations such as those shown at 24 and 26.

In the above-described embodiment the differential recovery ratio properties desired may be achieved by expansion of the two sheets to different degrees, even when the sheets are of the same material. It is also possible, when desired, that recovery occur at different times or temperatures in different zones. For instance, if it is desirable for the second sheet to recover before the first, the second sheet could be pigmented to increase infrared absorption, while the first sheet is left clear. Then, when heated by infrared radiation, the second sheet would recover before the first sheet. Additionally, since there are two separate sheets, the first sheet may be made of a material such as polyethelene which has a recovery temperature in the range of about 60° C. to about 110° C., while the second sheet could be made from ethylene/vinyl acetate copolymer which may have a recovery temperature between about 30° C. and about 90° C. Thus, when heat is applied to the connector, the working zones of the second sheet recover before the first sheet, clamping down upon the substrates inserted therein, while not melting. Upon continued application of heat, the first sheet recovers, forcing the inserts into the working zones and into contact with the substrates. As the recovery temperature of "cold expanded" materials, i.e. those expanded below their melting point, is dependent on the expansion temperature, it is possible for the two sheets to recover at different temperatures, even when they are of the same material.

The above described phenomenon is shown in some detail in FIGS. 3–5 and is described in more detail in the following paragraphs.

Substrates 28 and 30 are inserted into the working zone 20 of the connector as shown in FIG. 3. Upon the application of heat, the zone 20 recovers first, holding the substrates 28 and 30 within the connector in the desired relationship to each other and to inserts 16, as shown in FIG. 4. Also as shown in FIG. 4, the inserts have begun to soften and the pockets 14 to recover, partially ejecting the inserts into the working zone 20.

FIG. 5 illustrates the connector fully recovered after the application of heat. As can be seen, second sheet 18 conforms to substrates 28 and 30, sealing the connected substrates 28 and 30 against first sheet 12 which, as illustrated, has fully ejected the inserts 16 into the working zone 20 and around and between the articles 28 and 30. Also as shown, the pockets 14 have recovered fully and the first sheet 12 has returned to its unexpanded shape. The connector including the substrates is fully sealed by the flow of the inserts and the recovery of the sheets 12 and 18.

In particular applications, it may be desirable for the connector to connect closely spaced terminals. For such an application it is desirable to use a second sheet which has been formed into a plurality of omega shapes, as illustrated in FIG. 6 and denoted by the number 20. As can be seen in FIG. 6 the width of the bonding zone generally denoted by the letter F is the same as the width of the bonding zone generally shown in FIG. 1 and also indicated as being of width F. However, the omega-shaped working zone permits a smaller center-to-center spacing than the working zone shape shown in FIG. 1 and indicated by the numeral 20. As can be seen on comparing FIGS. 1 and 6, the distance between the center lines of the working zones 20 is $W_1$ in FIG. 1, while the distance between the center lines of the working zones of 20', shown in FIG. 6 is $W_2$, a smaller distance.

Thus, while the omega shape affords space to insert a greater number of substrates over the width of the connector, the bonding zone 22' has a width equal to that of the bonding zone 22 of the embodiment of FIG. 1. The omega shape shown in FIG. 6 maintains the desired property of keeping the center-to-center spacing of the working zones constant after recovery while adding the desirable feature of permitting more substrates to be connected for the same sized connector.

Different types of inserts may be used within the connector, as shown in FIG. 7. FIG. 7A shows solder inserts 16 between barriers 32 which may comprise sealants.

FIG. 7B shows the use of strip-shaped inserts 34, unlike the generally spherical inserts shown in FIG. 2.

As is best illustrated by 32 and 34 of FIG. 7, it is possible that the insert material may be printed on the surface of the first sheet 12. Also, as was suggested in the description of FIG. 2, pockets 14 may be preformed in first sheet 12 and, rather than impressing solid insert material into these pockets, the insert material may be printed into them.

Additionally, the connector may comprise an offset connector 36, as shown in FIG. 8. In such a boot connector, the substrates to be connected overlap, rather than abutting at the ends only, as has been shown in FIGS. 3–5.

FIG. 9 shows a right angle connector indicated by the numeral 38, wherein substrates 28 and 30 may be inserted into the connector at right angles and connected at that angle. As can be seen, insert 16 is placed in the manner described above.

In both FIGS. 8 and 9, that part of the second sheet 18 defining the working zone has been partially cut away to reveal the positional relationships between the substrates 28 and 30 and the insert 16.

FIGS. 10 and 11 show seventh and eighth embodiments of the invention, wherein the sheets are of approximately the same expansion ratio and/or recovery temperature. The objects of the invention heretofore recited must, of course, be kept in mind: in particular, previous embodiments maintained the distance between center lines of the working zones by different expansion ratios and/or recovery temperatures. In these embodiments the sheets are of substantially the same expansion ratio and/or recovery temperature and alternative methods must be employed to keep the spacing constant. The working zone 58 of the embodiment of FIG. 10 is substantially the same as that of the earlier embodiments. However, the bonding zone generally indicated by 62 comprises a compliant region wherein, as shown in the lower part of FIG. 10, upon recovery the compliant region recovers while the working zones 58 are held, such as by fixed terminals upon which they are emplaced. Thus the recovery occurs laterally in the compliant region while the working zone center line spacing $W_3$ remains constant.

FIG. 11 illustrates an alternative compliant region before and after recovery. In the embodiment of FIG. 11 the compliant region 66 comprises a weakened area 66 approximately midway between center lines of the working zones which, upon recovery, as shown in the lower part of FIG. 11, separates while the working zones 58 are held in place, as described above.

FIG. 12 illustrates an alternative connector, an udder 70 having an insert 16 for connecting substrates 28, 30 and 31 as shown.

These embodiments are generally intended for use with fixed terminal connectors wherein, upon recovery, the lateral recovery will occur in the compliant region as described above.

While the instant invention has been described in reference to what are now believed to be the preferred embodiments, it is understood that the invention may embody other specific forms not departing from the spirit of the central characteristics of the invention. In particular, substantial reference has been made throughout to cross-linked polymeric material as being heat-resistant (not melting at the temperature of activation of the inserts) and/or heat-recoverable. It should be understood that there are polymeric materials which possess heat resistance and/or recoverability without cross-linking, and the use of such materials is to be considered as within the scope of this invention. The present embodiments should therefore be considered in all respects as illustrative and not restrictive, the scope of the invention being limited solely by the appended claims rather than by the foregoing description, and all equivalents thereto being intended to be embraced herein.

What is claimed is:

1. A connector device for connecting substrates, which comprises:
   a first sheet having an original dimensionally stable shape;
   a second sheet having an original heat-stable shape, said shape being expanded relative to said first sheet to a second heat-unstable shape and thereafter being formed into alternate working and bonding zones, said working and bonding zones having horizontal center lines;
   inserts positioned between said first and second sheets at least within said working zones;
   said sheets being such that they will not melt at a temperature high enough to activate said inserts, and
   said sheets being bonded together at the bonding zones, whereby application of heat causes the working zones to conform to substrates to be connected when the substrates are inserted therein while said first sheet maintains the original center line spacing of the working zones.

2. The device of claim 1 wherein the first sheet includes localized expanded portions defining pockets for retaining the inserts on the first sheet.

3. The device of claim 2 wherein the working zones formed on the second sheet comprise omega shapes.

4. The device of claim 2 wherein the inserts are embedded in the first sheet creating pockets therein and which retain the inserts.

5. The device of claim 4 wherein the inserts have been embedded in the first sheet at a temperature below the recovery temperature of the first sheet.

6. The device of claim 2 or claim 4 wherein the inserts are inserted in localized expanded portions of the first sheet while not piercing the sheet, thereby creating an unobstructed passageway for insertion of substrates to be connected.

7. The device of claim 6 wherein the expanded portions of the first sheet serve as an indexing means for the device.

8. The device of claim 1 wherein the sheets are of cross-linkable material and are cross-linked prior to bonding.

9. The device of claim 1 wherein the sheets are of cross-linkable material and are bonded and subsequently cross-linked.

10. The device of claim 1 wherein the sheets are of cross-linkable material and are partially cross-linked prior to bonding, are then bonded, and are then further cross-linked.

11. The device of claim 1 wherein the inserts comprise solder.

12. The device of claim 1 wherein the inserts comprise a sealant.

13. The device of claim 1 wherein each working zone contains more than one type of insert.

14. The device of claim 1 wherein the second sheet includes pigmentation causing the sheets to have a different rate of recovery upon the application of infrared radiation.

15. The device of claim 1 wherein the connector is in the shape of a boot, the working zone of said boot being offset to guide and stop substrates to be connected in overlap.

16. The device of claim 1 wherein the connector is in the shape of an udder.

17. The device of claim 1 wherein the connector is in the shape of a right angle boot to guide and stop substrates to be connected in abutment.

18. A connector device for connecting substrates comprising:
   a first sheet having a dimensionally stable shape;
   a second sheet having an original heat-stable shape, said sheet being expanded relative to said first sheet to a second heat-unstable shape, said first sheet bonded to said second sheet so as to bridge at least a substantial part of said second sheet with dimensionally stable material, said sheets defining a hollow structure;
   an insert positioned between the first and second sheets within the hollow structure; and
   said sheets being such that they will not melt at a temperature high enough to activate said insert, the application of heat causing the second sheet to conform to substrates to be connected when the substrates are inserted therein, while the first sheet maintains dimensional stability.

19. The device of claim 18 wherein the first sheet includes localized expanded portions defining pockets for retaining the insert on the first sheet.

20. The device of claim 18 wherein the working zones formed on the second sheet comprise omega shapes.

21. The device of claim 19 wherein the insert is embedded in the first sheet creating pockets therein in which retain the insert.

22. The device of claim 21 wherein the insert have been embedded in the first sheet at a temperature below the recovery temperature of the first sheet.

23. The device of claim 19 or claim 21 wherein the insert is inserted in localized expanded portions of the first sheet while not piercing the sheet, thereby creating an unobstructed passageway for insertion of substrates to be connected.

24. The device of claim 23 wherein the expanded portions in the first sheet serve as an indexing means for the device.

25. The device of claim 18 wherein the sheets are of cross-linkable material and are cross-linked prior to bonding.

26. The device of claim 18 wherein the sheets are of cross-linkable material and are bonded and subsequently cross-linked.

27. The device of claim 18 wherein the sheets are of cross-linkable material and are partially cross-linked prior to bonding, are then bonded, and are then further cross-linked.

28. The device of claim 18 wherein the insert comprises solder.

29. The device of claim 18 wherein the insert comprises a sealant.

30. The device of claim 18 wherein the hollow structure contains more than one type of insert.

31. The device of claim 18 wherein the second sheet includes pigmentation causing the sheets to have a different rate of recovery upon the application of infrared radiation.

32. The device of claim 18 wherein the connector is in the shape of a boot and the hollow structure is offset to guide and stop substrates to be connected in overlap.

33. The device of claim 18 wherein the connector is in the shape of an udder.

34. The device of claim 18 wherein the connector is in the shape of a right angle boot to guide and stop substrates to be connected in abutment.

* * * * *